April 10, 1945.  R. K. BONELL  2,373,096

MAGNETIC PICK-OFF FOR SENSITIVE INSTRUMENTS

Filed Dec. 15, 1941

INVENTOR,
RALPH K. BONELL,
BY
Herbert P. Thompson
HIS ATTORNEY

Patented Apr. 10, 1945

2,373,096

UNITED STATES PATENT OFFICE 2,373,096

MAGNETIC PICK-OFF FOR SENSITIVE INSTRUMENTS

Ralph K. Bonell, New York, N. Y., assignor to Sperry Gyroscope Company, Inc., Brooklyn, N. Y., a corporation of New York Application December 15, 1941, Serial No. 422,999

2 Claims. (Cl. 177—351)

This invention relates to the remote indication of the readings of sensitive instruments, such as magnetic compasses, gyroscopic instruments and the like, and it relates more particularly to a system in which the instrument reading is translated by a pick-off into electrical potentials suitable for actuating an indicating device, the pick-off being sensitive to a magnetic field whose direction is altered in accordance with the instrument reading.

In U. S. Patent 2,047,609 to H. Antranikian, dated July 14, 1936, there is disclosed a device without moving members which is sensitive to the direction of a magnetic field and which depends for its operation upon the saturation characteristics of a core of magnetic material. A device of this general character will be referred to as a "flux valve."

It is one object of the present invention to make use of a flux valve as an element of a non-reacting pick-off for repeating the reading of a sensitive instrument.

Another object is to provide a system including an indicator adapted to repeat the indication of a sensitive instrument at a distance without exerting appreciable reaction upon the instrument.

Another object is to supply a remote indication of the reading of a sensitive instrument as a displaceable trace on the screen of a cathode ray tube.

A still further object is to repeat the reading of a magnetic compass through the medium of a magnetic field created by a member not in physical contact with the moving system of the compass.

Other objects and advantages of this invention will become apparent as the description proceeds.

Figure 2:
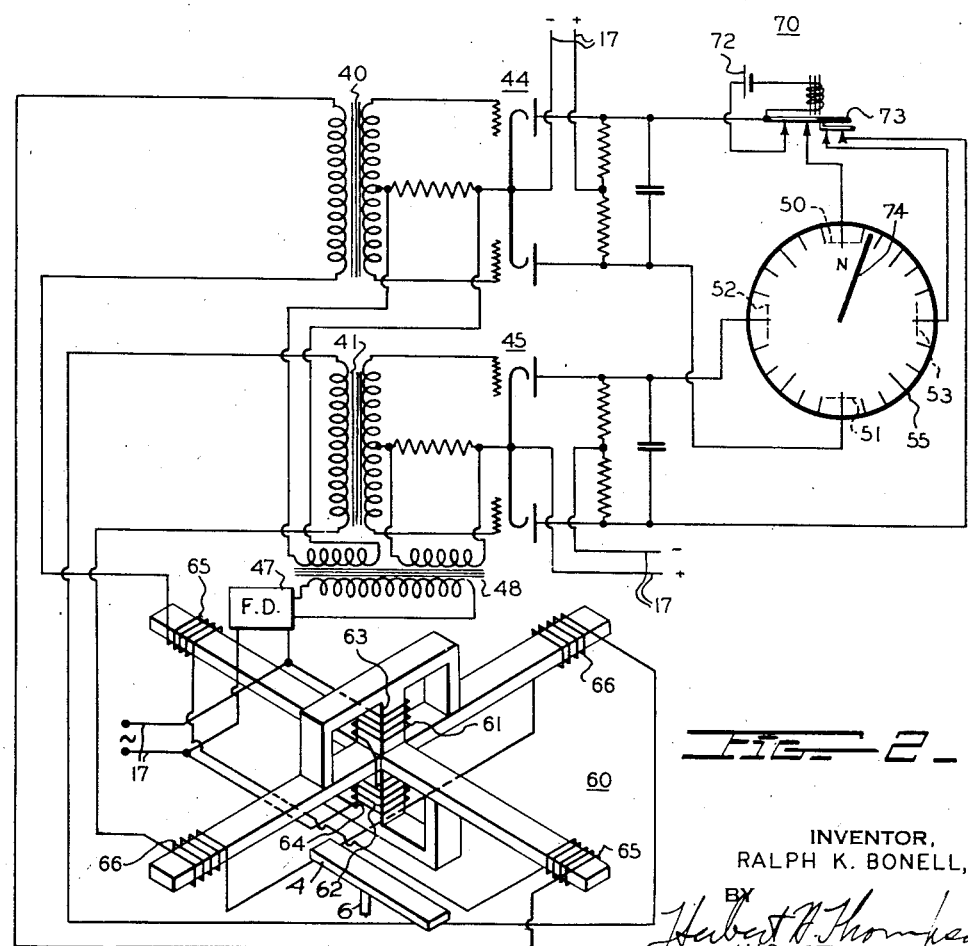
Fig. 2 illustrates a modified form of flux valve associated with a bar magnet and connected in circuit with a cathode ray indicator.

Referring first to Fig. 2, reference numeral 4 is applied to a bar magnet or bar magnet supported for free rotation in a horizontal plane by suitable anti-friction bearings as, for example, on spindle 6. For repeating the angular indication of magnet 4 without physical contact therewith, a pick-off or flux valve 60 is mounted in the field thereof and may be supported on the compass housing. The flux valve comprises pick-up coils in which electrical potentials are generated dependent on the strength and direction of the field of magnet 4 relative thereto. If this field is of constant strength, as will be the case with a permanent magnet, the output of the flux valve will vary solely in correspondence with changes in direction of the field. The output of the flux valve is connected with a cathode ray tube provided with a suitable scale.

In operation, magnet 4 will be oriented in accordance with the direction of the horizontal component of the earth's magnetic field and being itself a magnet may create a somewhat stronger field which will act upon the flux valve. There is thus provided means for obtaining a relatively strong magnetic field for actuating the flux valve whose direction corresponds to the direction of the earth's field.

The flux valves here shown are of the type previously described in copending U. S. application Ser. No. 385,622, filed March 28, 1941, by J. C. Purves and L. F. Beach, and U. S. application Serial No. 414,422, filed October 10, 1941, by O. E. Esval, R. Curry, C. Fragola and L. F. Beach, and comprise four-legged cores having pick-up or signal voltage-generating coils mounted on the legs thereof with a central coil excited with alternating current from a source 17 for producing alternating flux in each of the three legs of the core. When so excited to a suitable degree dependent upon the magnetic characteristics of the core material, the outputs of the pick-up are of double the frequency of source 17 and are respectively proportional to symmetrical components of the external unidirectional field produced by magnet 4 to which the flux valve is subjected.

Figure 1:
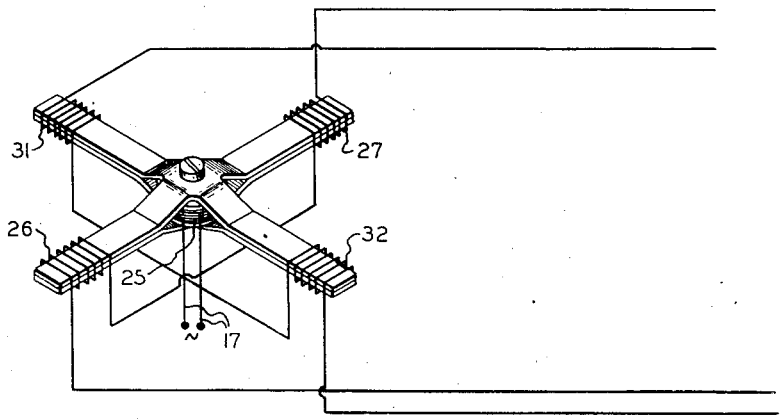
Fig. 1 is a perspective view of an exemplary form of flux valve.

Referring to Fig. 1, a centrally located exciting coil 25 is used in this construction for sending the alternating flux through a portion of each of the four radially extending legs of this core. Four pick-up coils are used, one on each leg with the coils on opposite legs connected in series and in a manner such that their outputs are additive. For example, coils 26 and 27 are connected in series and coils 31 and 32 are connected in series. The outputs of the several pick-up coils are proportional to the cosines of the angles which their respective axes make with the direction of an external unidirectional field or the axis of magnet 4. There is thus provided electrical means for resolving the field vector of the field of magnet 4 into two components at right angles to one another. The application of voltages proportional to these components to perpendicularly acting beam-deflecting means, respectively, produces a resultant field acting upon the electron beam of a cathode ray tube which corresponds to the direction of the field of magnet 4.

While ordinarily the trace of the cathode ray tube indicates the direction of the field, it does not indicate the sense thereof and to eliminate the 180° ambiguity in the reading of the compass resulting therefrom, the arrangement of Fig. 2 may be used. In this figure a slightly different form of flux valve 60 is illustrated, in which two exciting coils 61 and 62 are used, one for each of the perpendicularly positioned legs 63 and 64 of the core. The principle of operation is the same as that of the forms previously referred to; the alternating flux from an exciting coil bringing a portion of the magnetic circuit with which an output coil is associated to a non-linear region of its magnetization characteristic which renders the voltage induced in the output coil sensitive to a superimposed unidirectional field.

The two exciting coils 61 and 62 are excited from A. C. source 17 and two outputs are supplied from the two pairs of perpendicularly positioned output or pick-up coils 65 and 66 to input transformers 40 and 41, respectively, of a pair of phase sensitive circuits. The secondary winding of transformer 40 is connected to the grids of tube 44 comprising a pair of triode elements connected in push-pull relationship, while the secondary winding of transformer 41 is connected to the grids of a similar dual tube 45. Grid circuits of both tubes are supplied with an A. C. bias of reference phase derived from source 17 through frequency doubler and phase adjustor 47 and transformer 48. Doubling of the supply frequency is necessary in supplying reference phase to tubes 44 and 45 since the output of the flux valve is double the supply frequency, as has been pointed out.

Tubes 44 and 45 are further biased by D. C. means (not shown) to function as rectifiers and the plate circuits of these tubes are supplied with D. C. from a suitable source. Under these conditions, as is known, each tube will have a D. C. output reversing in polarity in correspondence with reversal of phase of the input A. C. Instead of an A. C. grid bias, an A. C. plate supply of reference phase may be employed. It will also be apparent from the known operation of flux valves that the phase of the output from coil 65, for example, reverses when the direction of the field crosses a line perpendicular to the common axis of these coils. The input to each rectifier, therefore, is not only proportional in magnitude to the magnitude of a component of the external field or the field of magnet 4, but also reverses in phase with reversal of the sense of the field. By the above described means there are supplied to the deflecting plates 50, 51, 52 and 53 of electrostatically controlled cathode ray tube 55, reversible polarity D. C. potentials corresponding in magnitude to the rectangular components of the magnetic field of magnet 4 and having polarities corresponding to the sense thereof.

The application of such steady component potentials to two pairs of deflecting plates at right angles to one another in tube 55 would result in the deflection of the spot produced by the electron beam from the center of the tube to a position along a radius corresponding in angular position to the angular position of the magnetic field of magnet 4.

It is desirable, however, for indicating purposes, to produce a trace in the form of a line rather than a spot and for this purpose there may be included in each of the output circuits of tubes 44 and 45 means for periodically varying the deflecting potentials, such as interrupter 70. Interrupter 70 consists of a "buzzer" circuit excited by battery 72 which causes the oscillation of armature 73 and thereby the simultaneous periodical making and breaking of the circuits between tubes 44 and 45 and the deflecting plates of the cathode ray tube. Because of the rapid rate of radial oscillation of the spot produced by this means, the appearance of a radial line is produced as indicated at 74 and this line will be positioned angularly and without ambiguity in accordance with the direction of the magnetic field of magnet 4.

While the invention has been described particularly in connection with its preferred use as a magnetic compass, it will be understood that similar arrangements may be used in repeating the indications of any sensitive instrument, it being only necessary to drive from a moving element of the sensitive instrument means similar to magnet 4, or otherwise provide for the production of an angularly adjustable magnetic field to which a flux valve is caused to be responsive.

Also, while the signal from the flux valve has been described as actuating an indicator, obviously it may be utilized to actuate equipment suitable for automatic control or remote positioning equipment, such as automatic pilots for ships or aircraft.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a non-reactive, remote reading magnetic compass system comprising a flux valve including a core having a plurality of legs the axes thereof being relatively angularly disposed and means including a source of periodically varying current for producing a periodically varying flux in said core and coils associated with each of said core legs for producing alternating voltages respectively proportional to the components of an external unidirectional magnetic field along said axes, and a cathode ray tube including beam-deflecting means acting along axes corresponding respectively to the axes of said core, the combination with phase-sensitive means for rectifying the outputs of said coils, of means for supplying the rectified potentials of said coils respectively to corresponding beam-deflecting means of said tube including independent means for periodically varying the rectified potentials whereby to produce a linear beam trace along a radius only and along the path defined by said potentials.

2. In a non-reactive system for remotely indicating direction, a core of magnetic permeable material comprising a plurality of legs, the axes thereof being relatively angularly disposed, means for exciting said core with periodically varying flux, said core having a plurality of pick-up windings associated respectively with the legs thereof and adapted to supply alternating voltage outputs proportional to components of an external unidirectional magnetic field along said axes, and a cathode ray tube having a plurality of beam-deflecting means acting along axes corresponding respectively to the axes of said core, the combination with rectifier means for obtaining from each of said A. C. outputs a D. C. potential proportional in magnitude thereto and reversing in polarity with reversal of phase thereof, of circuit means for applying said D. C. potentials respectively to corresponding beam deflecting means and including independent means for periodically interrupting the D. C. potentials applied to said beam deflecting means of the tube whereby to produce a linear beam trace along the path defined by said potentials and lying to one side only of the electrical center of said tube.

RALPH K. BONELL.